US007542746B2

(12) United States Patent
Olson et al.

(10) Patent No.: US 7,542,746 B2
(45) Date of Patent: Jun. 2, 2009

(54) RDS RADIO UNIT

(75) Inventors: Johan Olson, Furulund (SE); Joakim Wesslen, Staffanstorp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 508 days.

(21) Appl. No.: 11/307,554

(22) Filed: Feb. 13, 2006

(65) Prior Publication Data

US 2007/0129035 A1 Jun. 7, 2007

Related U.S. Application Data

(60) Provisional application No. 60/597,441, filed on Dec. 2, 2005.

(51) Int. Cl.
*H04B 1/18* (2006.01)

(52) U.S. Cl. ............... 455/161.3; 455/184.1; 455/186.1

(58) Field of Classification Search ................. 455/434, 455/515, 161.1, 161.2, 161.3, 179.1, 185.1, 455/186.1, 184.1

See application file for complete search history.

(56) References Cited

U.S. PATENT DOCUMENTS

| | | | | |
|---|---|---|---|---|
| 5,584,051 | A * | 12/1996 | Goken | 455/68 |
| 5,745,845 | A | 4/1998 | Suenaga et al. | |
| 6,535,752 | B1 * | 3/2003 | Dent | 455/574 |
| 2006/0009216 | A1 * | 1/2006 | Welnick et al. | 455/434 |

FOREIGN PATENT DOCUMENTS

| | | | |
|---|---|---|---|
| DE | 39 34 314 | A1 | 4/1990 |
| EP | 0433596 | A | 6/1991 |
| EP | 0 552 442 | A2 * | 7/1993 |
| GB | 2409360 | A | 6/2005 |

* cited by examiner

*Primary Examiner*—Nguyen Vo

(74) *Attorney, Agent, or Firm*—Renner, Otto, Boisselle & Sklar, LLP

(57) ABSTRACT

The invention relates to an RDS radio unit implementing a user friendly algorithm for automatic frequency change without inconveniencing the user with interruptions. A timer is used to delay the start of searches for a better frequency. The RDS radio unit comprises: a radio tuner (2) tunable to radio frequencies; a control unit (3) capable of controlling the radio tuner and monitoring received signal strength on a frequency to which the radio tuner is tuned, a memory (4) for receiving and storing a list of alternative frequencies; a timer (5) capable of timing a number of operations. The control unit is adapted to perform a search for a better channel frequency than an original frequency with a program matching the original frequency only when a first time T1 has elapsed, since the occurrence of an alternative frequency update request or a detection of received signal strength below a predetermined threshold. The present invention also relates to a telecommunication device (1) incorporating such an RDS radio unit.

11 Claims, 2 Drawing Sheets

RDS RADIO UNIT

CROSS REFERENCE TO RELATED APPLICATIONS

This application claims the benefit of a U.S. Provisional Application No. 60/597,441 filed Dec. 2, 2005.

FIELD OF THE INVENTION

The present invention relates to an RDS radio unit implementing a user friendly algorithm for automatic frequency change without inconveniencing the user with interruptions. A timer is used to delay the start of searches for a better frequency. The present invention also relates to a telecommunication device incorporating such an RDS radio unit.

BACKGROUND

Today many mobile telephones and handheld devices include an RDS (Radio Data System) FM radio together with other main or subsidiary functions. The radio is usually implemented on a chip with only one radio tuner.

In RDS an AF, Alternative Frequencies, list is sent to radio receivers tuned in to a program. The list of alternative frequencies give information on the various transmitters broadcasting the same program in the same or adjacent reception areas, and enable receivers equipped with a memory to store one or more lists to reduce the time for switching to another transmitter.

Furthermore, a PI, Program Identification, code is transmitted together with the program on the channel. This information consists of a code enabling the receiver to distinguish between countries or areas in which the same program is transmitted, and the identification of the program itself. The code is not intended for direct display and is assigned to each individual radio program, to enable it to be distinguished from all other programs. One important application of this information is to enable the receiver to search automatically for an alternative frequency in case of bad reception of the program to which the receiver is tuned; the criteria for the change-over to the new frequency would be the presence of a better signal having the same Program Identification code.

A problem with a handheld device is that the received signal strength may fluctuate rapidly when the device is moving. When the radio senses a low signal this triggers a search for a better channel with the same program. If the device only contains one tuner the radio will be silent during the search. This results in repeated interruptions inconveniencing the listener. Also, the fluctuation may be of such short duration, that a change of channel is not really necessary.

SUMMARY OF THE INVENTION

An object of the present invention is to implement a user friendly algorithm for RDS FM Radio Alternative Frequency in a handheld device.

The implemented algorithm uses timers and the RDS PI (Program Identification) field to create a user friendly AF solution which does not disturb the listening experience.

The invention may use different timers together with PI information when executing the AF jump procedure.

In a first aspect, the invention provides an RDS radio unit comprising: a radio tuner tunable to radio frequencies;

a control unit capable of controlling the radio tuner and monitoring received signal strength on a frequency to which the the radio tuner is tuned, storage means for receiving and storing a list of alternative frequencies;

timer means capable of timing a number of operations; wherein the control unit is adapted to perform a search for a better channel frequency than an original frequency with a program matching the original frequency only when a first time T1 has elapsed, since the occurrence of an alternative frequency update request or a detection of a received signal strength below a predetermined threshold.

Preferably, the control unit is adapted to perform the search during a second time T2 by tuning the radio tuner through frequencies on the list, and if a matching program is found, the radio tuner stays on the found channel frequency, but if T2 runs out before any matching program is found, or if the end of the AF list has been reached, the search through the list is discontinued.

In one embodiment, the control unit is adapted to perform next search for a better channel frequency only when a third time T3 has elapsed, if a search for a better channel frequency has failed once.

Then, the control unit may be adapted to perform next search for a better channel frequency only when a fourth time T4 has elapsed, if a search for a better channel frequency has failed more than once.

Suitably, the times are selected such that T1<T3<T4.

In one embodiment, T1 equals around 1 second, T3 equals around one minute, and T4 equals around ten minutes.

Suitably, T2 is in the same range as T1.

Suitably, T2 equals around 1 second.

In a second aspect, the invention provides a telecommunication device incorporating an RDS radio unit with a radio tuner tunable to radio frequencies;

a control unit capable of controlling the radio tuner and monitoring received signal strength on a frequency to which the the radio tuner is tuned, storage means for receiving and storing a list of alternative frequencies;

timer means capable of timing a number of operations; wherein the control unit is adapted to perform a search for a better channel frequency than an original frequency with a program matching the original frequency only when a first time T1 has elapsed, since the occurrence of an alternative frequency update request or a detection of a received signal strength below a predetermined threshold.

Preferably, the control unit is adapted to perform the search during a second time T2 by tuning the radio tuner through frequencies on the list, and if a matching program is found, the radio tuner stays on the found channel frequency, but if T2 runs out before any matching program is found, or if the end of the AF list has been reached, the search through the list is discontinued.

In one embodiment, the control unit is adapted to perform next search for a better channel frequency only when a third time T3 has elapsed, if a search for a better channel frequency has failed once, and wherein the control unit is adapted to perform next search for a better channel frequency only when a fourth time T4 has elapsed, if a search for a better channel frequency has failed more than once.

Suitably, the times are selected such that T1<T3<T4.

The device may be a mobile telephone, a pager, a communicator, a smart phone, or an electronic organiser.

BRIEF DESCRIPTION OF THE DRAWINGS

The invention will be described in detail below with reference to the accompanying drawings, in which.

DETAILED DESCRIPTION OF PREFERRED EMBODIMENTS

The invention is described with reference to a radio implemented in a handheld device, e.g. a telecommunication device such as a mobile telephone, a pager, a communicator, a smart phone, or an electronic organiser. In such devices there is often only one radio tuner because of space requirements. When the radio is tuned to another frequency as necessitated to change channel, there is no back-up tuner to maintain the program during the search for a new channel, which may be the case in larger radios such as car radios.

The radio unit is controlled by a processor and software, and may be implemented by conventional components. The novelty of the invention resides basically in the operation to enable RDS function without inconveniencing the user with unnecessary interruptions.

Figure 2:
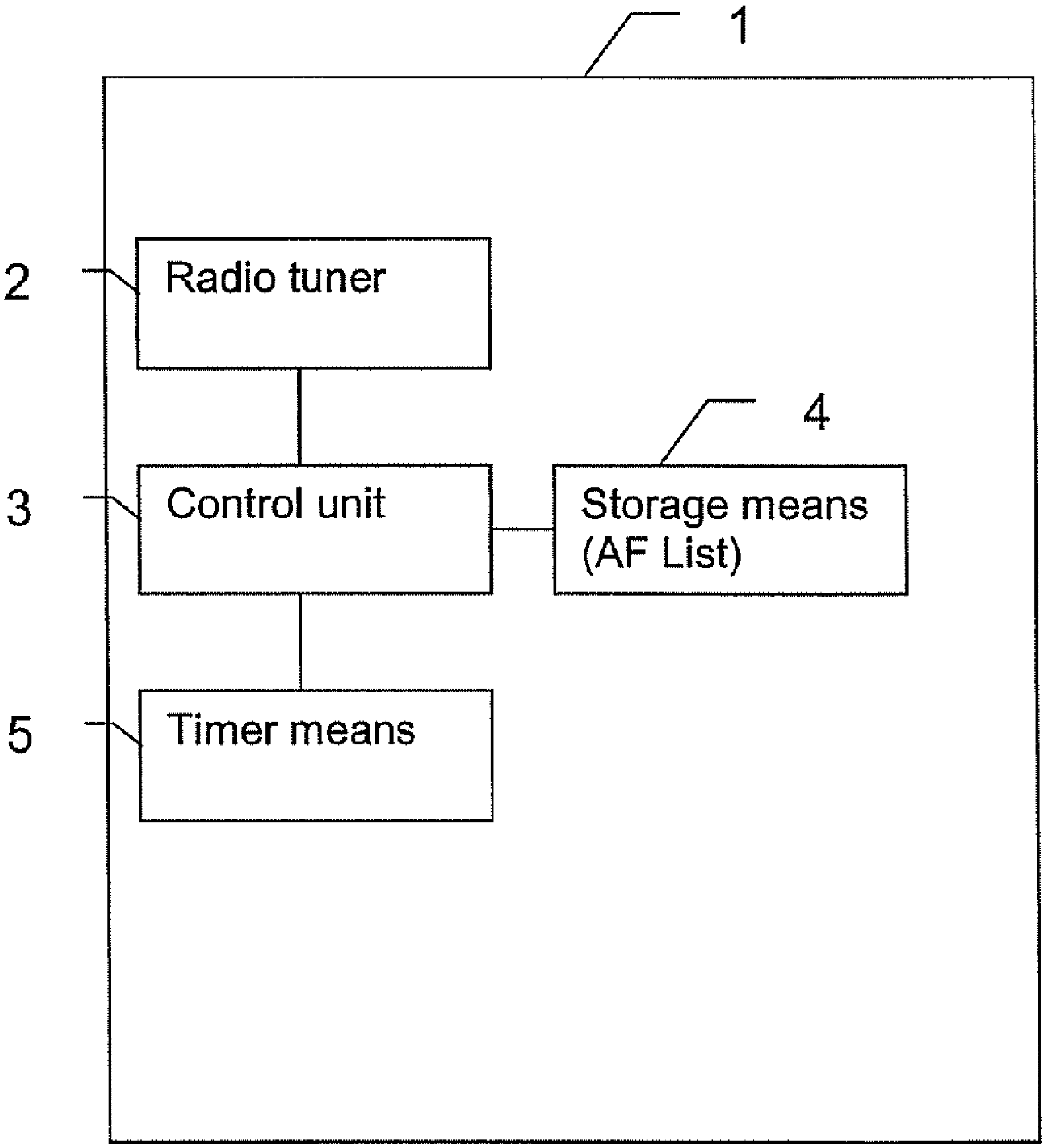
FIG. 2 is a schematic diagram of an embodiment of the invention.

A schematic representation of a telecommunication device 1 is shown in FIG. 2. The device comprises a radio telecommunication interface and a user interface with a display and a keyboard which may be conventional and are not described in detail here. The invention is also applicable in a stand alone radio. The device comprises a radio unit or tuner 2 adapted to receive a program on a radio frequency and also capable of extracting control information from the received signal, such as an AF request and lists as discussed below. A control unit 3 is capable of controlling the radio on the basis of user commands and software among other things implementing the procedure according to invention. A storage means 4 cooperates with the control unit 3 to store useful data such as AF lists. A timer means 5 is provided to measure the time of operations based on a clock signal and commands from the control unit 3.

According to RDS standard, the received signal strength is monitored continuously by the radio unit 2. A search for a better channel with the same program is triggered by an AF (Alternative Frequency) request, typically resulting from a measurement of a received signal strength RSSI (Received Signal Strength Indication) having a value below a predetermined threshold.

In an embodiment of the invention, the search is not started immediately, but only after a time period T1. If the received signal strength has only dropped temporarily, the time period T1 gives the signal a chance to regain an acceptable value, without going through a search procedure. If the time period T1 has elapsed and the received signal strength is still too low, the AF search is started.

The AF search searches for a different AF frequency having a greater received signal strength then the original frequency and transmitting the same program as identified with the Program Identification code PI. In an embodiment of the invention, a new AF frequency must have been found before a time period T2, otherwise the AF search is considered having failed.

In an embodiment of the invention, if the AF search has failed once, a further time period T3 must have elapsed before a new AF search is started. The idea is that a new search is more likely to succeed after a waiting period, since the drop in received signal strength is probably not only a short fluctuation. In the meantime, the user is not interrupted by AF searches, even though the received signal strength may be low. T3 is suitably in the order of one minute.

In an embodiment of the invention, if the AF search has failed more than once, an even longer time period T4 must have elapsed before a new AF search is started. The idea is that a new search is more likely to succeed after a longer waiting period, since the drop in received signal strength is probably not only temporary. In the meantime, the user is not interrupted by AF searches, even though the received signal strength may be low. T4 is suitably in the order of ten minutes.

Figure 1:
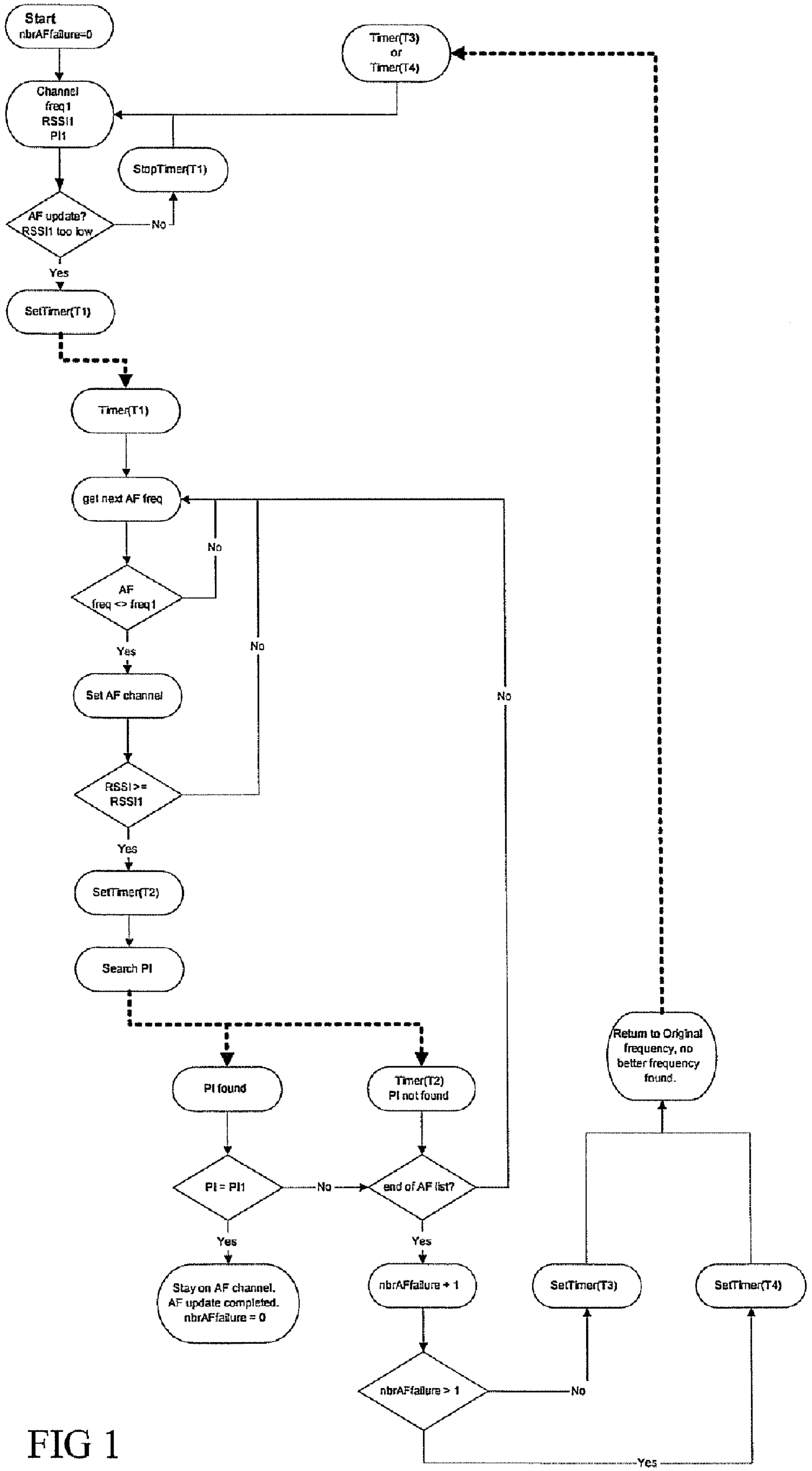
FIG. 1 is a flow diagram of an embodiment of the procedure of the invention.

A diagram of an AF search procudure according to an embodiment of the invention is shown in FIG. 1.

nbrAFfailure is a counter counting the number of failed searches for a new channel. At the start, nbrAFfailure=0, and in this example the channel frequency is Channel freq1, the received signal strength RSSI (Received Signal Strength Indication) is RSSI1, and the Program Identification PI is PI1.

If there is an AF update request or RSSI1 is too low, this normally triggers a search. In an embodiment of the present invention, initially a first timer T1 is set. Only when the time T1 has elapsed, the search through the AF list is entered. If the received signal strength is not too low at the end of the time period T1, the timer stops and is reset, and the procedure returns to monitor the received signal strength.

In the next steps the AF list is gone through until a frequency not equal to freq1 is found and the received signal strength RSSI>RSSI1. First the next AF frequency from the list is examined. If this frequency is not equal to freq1, the radio tuner is set to this frequency. Then the received signal strength RSSI is compared with RSSI1. If RSSI>RSSI1, this frequency is a candidate. Then a second timer T2 is set. While the timer T2 is running a search is made to find a PI=PI1. The PI of the program transmitted on this frequency is compared with PI1. If PI equals PI1, the radio tuner stays at this frequency. This means that the AF search procedure has succeeded. Then the procedure returns to monitor the received signal strength. nbrAFfailure is reset to 0 and the timer T2 is stopped.

If PI not equals PI1, the next AF frequency is examined. If there are no more AF frequencies or the time period T2 has elapsed, the AF search has failed, and nbrAFfailure is incremented by 1. The radio tuner is returned to the original frequency freq1.

If the procedure this far has failed once, i.e. nbrAFfailure=1 (nbrAFfailure>1?–No), a third timer T3 is set. Then the time T3 must elapse before the procedure is allowed to start again.

If the procedure has failed more than once, i.e. nbrAFfailure>1, a fourth timer T4 is set. Then the time T4 must elapse before the procedure is allowed to start again.

In one embodiment, the times T1, T2, T3, and T4 are set in the following manner. T1 is suitably short, in the order of one second. This results in that rapid decreases in received signal strength that have disappeared during T1 will be ignored, and no search for a better channel is attempted, since the received signal strength has already improved.

T2 is suitably in the same order as T1. The radio is preferably silent during the time period T2, unless there is a back-up radio tuner that is capable of sending on the original frequency during a search for a new AF frequency.

T3 is suitably in the order of one minute. This results in that the radio will stay on a relatively poor channel (freq1) for one minute, when the search has failed once. The procedure presumes that it is not likely that a new search sooner than a minute would succeed.

T4 is suitably in the order of ten minutes. This results in that the radio will stay on a relatively poor channel for ten minutes, since searches have failed more than once. The procedure presumes that it is not likely that a new search sooner than ten minutes would succeed.

The invention may be implemented by means of suitable combinations of hardware and software. The scope of the invention is only limited by the claims below.

What is claimed is:

1. An RDS radio unit comprising:

a radio tuner tunable to radio frequencies;

a control unit capable of controlling the radio tuner and monitoring received signal strength on a frequency to which the radio tuner is tuned, storage means for receiving and storing a list of alternative frequencies;

timer means capable of timing a number of operations; wherein the control unit is configured to perform a search for a better channel frequency than an original frequency with a program matching the original frequency only when a first time T1 has elapsed since the occurrence of an alternative frequency update request or a detection of a received signal strength below a predetermined threshold, and the received signal strength has not regained an acceptable value during T1;

wherein the control unit is configured to perform the search during a second time T2 by tuning the radio tuner through frequencies on the list of alternative frequencies, and if a matching program is found, the radio tuner stays on the found channel frequency, and if T2 expires before a matching program is found, or if the end of the alternative frequencies list has been reached, the search through the alternative frequencies list is discontinued, and the control unit increments a counter to indicate the number of discontinued searches for alternative frequencies, the counter used to determine when to restart the search.

2. An RDS radio unit according to claim 1, wherein the control unit is adapted to perform next search for a better channel frequency only when a third time T3 has elapsed, if a search for a better channel frequency has failed once as indicated by the count of discontinued searches.

3. An RDS radio unit according to claim 2, wherein the control unit is adapted to perform next search for a better channel frequency only when a fourth time T4 has elapsed, if a search for a better channel frequency has failed more than once as indicated by the count of discontinued searches.

4. An RDS radio unit according to claim 3, wherein T1<T3<T4.

5. An RDS radio unit according to claim 4, wherein T1 equals around 1 second, T3 equals around one minute, and T4 equals around ten minutes.

6. An RDS radio unit according to claim 4, wherein T2 is in the same range as T1.

7. An RDS radio unit according to claim 6, wherein T2 equals around 1 second.

8. A telecommunication device, comprising:

an RDS radio unit with a radio tuner tunable to radio frequencies;

a control unit capable of controlling the radio tuner and monitoring received signal strength on a frequency to which the radio tuner is tuned, storage means for receiving and storing a list of alternative frequencies;

timer means capable of timing a number of operations; wherein the control unit is configured to perform a search for a better channel frequency than an original frequency with a program matching the original frequency only when a first time T1 has elapsed since the occurrence of an alternative frequency update request or a detection of a received signal strength below a predetermined threshold, and the received signal strength has not regained an acceptable value during T1;

wherein the control unit is configured to perform the search during a second time T2 by tuning the radio tuner through frequencies on the list of alternative frequencies, and if a matching program is found, the radio tuner stays on the found channel frequency, and if T2 expires before a matching program is found, or if the end of the alternative frequencies list has been reached, the search through the alternative frequencies list is discontinued, and the control unit increments a counter to indicate the number of discontinued searches for alternative frequencies, the counter used to determine when to restart the search.

9. A telecommunication device according to claim 8, wherein the control unit is adapted to perform next search for a better channel frequency only when a third time T3 has elapsed, if a search for a better channel frequency has failed once as indicated by the count of discontinued searches, and wherein the control unit is adapted to perform next search for a better channel frequency only when a fourth time T4 has elapsed, if a search for a better channel frequency has failed more than once as indicated by the count of discontinued searches.

10. A telecommunication device according to claim 9, wherein T1<T3<T4.

11. A telecommunication device according to claim 8, wherein the device is a mobile telephone, a pager, a communicator, a smart phone, or an electronic organiser.

* * * * *